United States Patent [19]
Ross et al.

[11] 3,740,625
[45] June 19, 1973

[54] ELECTRICAL CAPACITORS WITH ESTER IMPREGNANTS

[75] Inventors: Sidney D. Ross, Williamstown; Manuel Finkelstein, North Adams, both of Mass.

[73] Assignee: Sprague Electric Company, North Adams, Mass.

[22] Filed: Nov. 4, 1971

[21] Appl. No.: 195,856

[52] U.S. Cl. .................. 317/259, 252/64, 317/258
[51] Int. Cl. ............................................. H01g 3/19
[58] Field of Search ................. 317/258, 260, 259; 252/64

[56] References Cited
UNITED STATES PATENTS
3,363,156   1/1968   Cox.................................. 317/259

*Primary Examiner*—E. A. Goldberg
*Attorney*—Vincent H. Sweeney and Connolly and Hutz

[57] ABSTRACT

Esters are used as impregnants in AC and energy storage capacitors, wherein the esters have alkyl groups substituted around the carbonyl carbon atom to effectively prevent hydrolytic attack thereof by water or hydroxide ions. Appropriate substitution in both the acid and the alcohol moieties insures a hydrolytic stability for the esters produced thereby.

10 Claims, 1 Drawing Figure

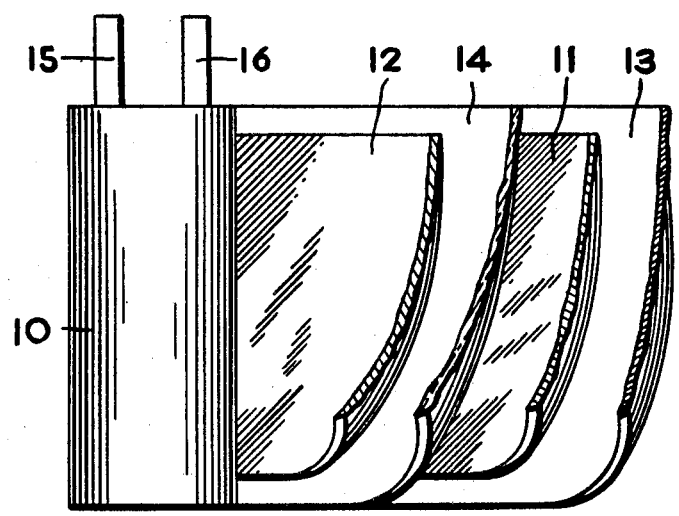

3,740,625

ELECTRICAL CAPACITORS WITH ESTER IMPREGNANTS

BACKGROUND OF THE INVENTION

This invention relates to ester impregnants for electrical capacitors, and more particularly to esters having alkyl groups substituted therein so as to substantially surround the carbonyl carbon atom.

A suitable dielectric oil for AC and energy storage capacitors must have the following physical characteristics: 1) Freezing point and pour point below −40°C; 2) Negligible vapor pressure at 125°C and 100 microns; 3) Flash point greater than 350°F; and 4) A viscosity of 1,000 centipoises or less at 100°C. The required electrical parameters for same are: 1) a dielectric constant greater than 2.4 but smaller than 10; 2) a volume resistivity in excess of $10^{10}$ ohm-cm; and 3) a power factor of less than 0.1 percent and preferably less than 0.05 percent.

Many esters are capable of meeting the foregoing requirements, but have been used infrequently because of chemical and economic reasons. The chemical reason is that most esters lack sufficient hydrolytic stability. In the presence of water or hydroxide ion, the ester is in equilibrium with the components from which it is made — namely, an acid and an alcohol. The hydrolysis generates an acid which decreases the resistivity of the dielectric oil and promotes degradation of the unit.

The hydrolysis of an ester involves attack by water or hydroxide ion at the carbonyl carbon atom. The reaction can be both acid and/or base catalyzed, but a typical dielectric fluid would be essentially neutral, and the hydrolysis of concern would involve attack by a neutral water molecule. But such attack can be significant, particularly at the elevated temperature at which capacitors frequently must operate.

Recently, polyolefin film capacitors, for example, polypropylene, have been reported to be capable of being fully impregnated with a dielectric liquid of the type comprising a halogenated aromatic compound having from one to five chlorine substituents and from one to three aryl groups. It has been determined, however, that it is only with extreme difficulty that this type of unit can be impregnated, even when employing a paper dielectric film as a wicking aid in conjunction with the polypropylene film.

In view of this difficulty, it has been found necessary, for the impregnation of commercial units, to employ with the polypropylene film, a porous cellulosic dielectric, e.g. Kraft paper, and also to employ special heat cycling procedures, after initial impregnation of the unit, in order to achieve maximum impregnation of the device. Such means obviously increase the cost of the unit.

Accordingly, it is an object of the present invention to provide ester impregnants for electrical capacitors that are virtually insensitive to hydrolytic attack.

It is another object of this invention to provide ester impregnants for use in polypropylene film capacitors that mesh and fit well with the highly branched molecular structure of the polypropylene film.

SUMMARY OF THE INVENTION

In accordance with the present invention there is provided a capacitance section sealed within a capacitor housing means. The capacitance section comprises at least a pair of electrodes and a dielectric spacer between the electrodes. The capacitor is fully impregnated with at least a major proportion of appropriately substituted esters. The esters are virtually insensitive to hydrolytic attack because of the appropriate substitution in both the acid and alcohol moieties used to prepare these esters.

The attack by water can be virtually eliminated by surrounding the carbonyl carbon atom by alkyl groups. The introduction of two or even one alkyl substitutents at the "2 position" of the acid or the alcohol may give an ester sufficient hydrolytic stability to be useful as a dielectric fluid.

Branched alkyl groupings used therein mesh and fit well with the highly branched molecular structure of the polypropylene film that has recently been used in some capacitor applications.

BRIEF DESCRIPTION OF THE DRAWING

The drawing illustrates a capacitance section 10 of the type with which the present invention is concerned. This section will be positioned within a capacitor container or housing means (not shown) and later impregnated with the fluid dielectric of the present invention. Section 10 comprises a convolutely wound section having metal electrodes 11 and 12 separated by dielectric spacers 13 and 14, such as polypropylene film or Kraft paper. The capacitance section has electrode tabs 15 and 16 which are in contact with electrodes 11 and 12 and which will thereafter make contact to the underside of a conventional capacitor can cover assembly containing tab terminals.

DESCRIPTION OF THE PREFERRED EMBODIMENTS

Esters can be used advantageously as dielectric fluids when alkyl groups having straight or branched chains are substituted at the carbon atoms that are "α" to the ester carbonyl and/or "β" to the ester ether linkage, that is, when the ester is made from 2-substituted acids and 2-substituted alcohols. This substitution effectively renders the ester impervious to hydrolytic attack by water or hydroxide ion, and makes the ester more compatible with a polyolefin film such as polypropylene.

The hydrolysis of an ester involves attack by water or hydroxide ion at the carbonyl carbon atom. The reaction can be both acid and base catalyzed, but a typical dielectric fluid would be essentially neutral, and the hydrolysis of concern would involve attack by a neutral water molecule. Where two alkyl groups have been introduced in the "2 position" of the acid moiety, and two alkyl substituents have been introduced in the "2 position" of the alcohol moiety, the ease of hydrolysis is diminished by as much as four orders of magnitude.

While such an extreme degree of substitution is desirable, since it affords a maximum margin of safety, it is not essential. In specific cases, the introduction of two or even one alkyl substituents at the "2 position" of the acid or the "2 position" of the alcohol may result in an ester having sufficient hydrolytic stability to be useful as a dielectric fluid.

Most of the esters with the desired substituents can be made by normal acid catalyzed esterification, using benzene, toluene or xylene to entrain the water formed and to shift the equilibrium in the direction of the ester. In the more difficult cases, the acid can be converted to the acid chloride, usually by reaction with thionyl chloride, and reacted with the alcohol in an inert solvent such as benezene in the presence of a base such as pyridine to produce the ester.

Advantageously, the esters used should have a dielectric constant greater than 2.4 but smaller than 10. If the ester's dielectric constant is in excess of 10, this will frequently result in the material having ionic contaminants present that are very difficult, if not presently impossible, to remove. Esters having an appropriate dielectric constant are easily obtained. Some of these include dibutyl phthalate, a $C_{16}$ ester that has a dielectric constant of 6.43 to 30°C; amyl benzoate, a $C_{12}$ ester, has a dielectric constant of 5.00 at 20°C; ethyl dodecanoate, a $C_{14}$ ester, has a dielectric constant of 3.44 at 20°C; and dioctyl phthalate, a $C_{24}$ ester, has a dielectric constant of 5.1 at 25°C. Since most pure hydrocarbons have a dielectric constant close to two, the origin of the higher dielectric constants is the dipole moment of the ester grouping. Therefore, esters have significantly more or significantly less alkyl substitution than those cited above would still have dielectric constants of the appropriate magnitude.

The flash points of esters can be increased by increasing the molecular weight and thus decreasing the volatility, and esters with flash points in excess of 450°F are plentiful. As a class, the esters have low viscosities, and esters having flash points in excess of 500°F frequently have viscosities of less than 10 centipoises at 210°F.

It is more advantageous to impregnate the capacitance section with a liquid dielectric and one that does not set upon standing, as such an arrangement produces air spaces or air gaps therein that inhibit complete impregnation and result in failure of the capacitor under voltage because of sparking and corona. Therefore, when using esters herein that are solids, it is preferred that blends are prepared with other liquid esters of this invention so as to insure that the ester to be used as the impregnant is in liquid form.

We have found the following classes of esters to be suitable for use in dielectric fluids:

(I)
$$R_1-CH_2-\underset{\underset{R_3}{|}}{\overset{\overset{R_2}{|}}{C}}-\overset{O}{\overset{\|}{C}}-O-CH_2-\underset{\underset{R_5}{|}}{\overset{\overset{R_4}{|}}{C}}-CH_2-R_1$$

wherein $R_1$ is a $C_1$—$C_{12}$ alkyl group; $R_2$ is a member selected from $CH_3$ and H; $R_3$ is $CH_3$ or H; $R_4$ is a member selected from $CH_3$, $C_2H_5$ and H; and $R_5$ is a member selected from $CH_3$, $C_2H_5$ and H, but at least one, and preferably two, of the groups $R_2$, $R_3$, $R_4$ or $R_5$ is not H.

Preferred compounds herein are those in which $R_2$ and $R_3$ are $CH_3$; $R_4$ is $C_2H_5$ and $R_5$ is H; and those in which $R_2$, $R_3$, $R_4$ are $R_5$ are all $CH_3$.

(II)

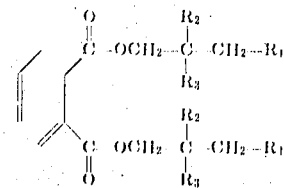

wherein $R_1$ is a $C_1$—$C_{12}$ alkyl group; $R_2$ is a $CH_3$ or $C_2H_5$; and $R_3$ is $CH_3$ or H.

Preferred embodiments are those in which $R_2$ is $C_2H_5$ and $R_3$ is H; and those in which $R_2 = R_3 = CH_3$.

(III)

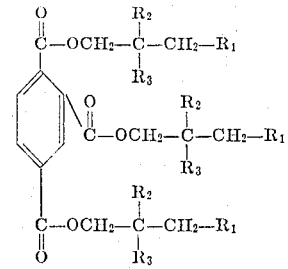

wherein $R_1$ is a $C_1$—$C_{12}$ alkyl group; $R_2$ is a $CH_3$ or $C_2H_5$; and $R_3$ is $CH_3$ or H.

Preferred embodiments are those in which $R_2$ is $C_2H_5$ and $R_3$ is H; and those in which $R_2 = R_3 = CH_3$.

(IV)

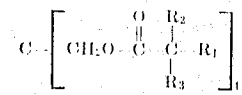

wherein $R_1$ is a $C_1$—$C_{12}$ alkyl group; $R_2$ is a $CH_3$ or H; and $R_3$ is a $CH_3$ or $C_2H_5$.

(V)

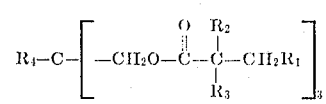

wherein $R_1$ is a $C_1$—$C_{12}$ alkyl group; $R_2$ is $CH_3$ or H; $R_3$ is $CH_3$ or $C_2H_5$; and $R_4$ is $CH_3$ or $C_2H_5$.

(VI)

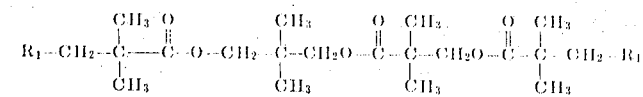

wherein $R_1$ is a $C_1$—$C_{12}$ alkyl group.

It should be noted that the starting materials for this ester, hydroxypivalyl hydroxypivalate,

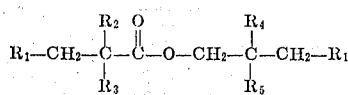

and the neo-acids,

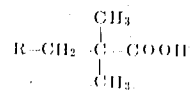

are available as items of commerce, as are all of the starting materials necessary to produce the esters outlined above.

For capacitor applications, it is not essential to have a single pure compound as the dielectric fluid. Blends and mixtures thereof frequently result in advantageously lower viscosities and lower pour points than the individual compounds mixed therein. Blends and mixtures permit the use of mixed acid and/or mixed alcohol stocks readily available from the chemical and petrochemical industry for the preparation of the desired esters. This, of course, is more economical than using the pure compounds.

Some available acids that can advantageously be used as starting materials for the purposes of this invention include: the neo-acids, 2-methylpentanoic acid; 2-ethylbutyric acid; 2ethylhexanoic acid; phthalic acid; and trimellitic acid (available as an anhydride). Available alcohols include: 2,2,4-trimethylpentanol; 2-methylpentanol; 2-ethylhexanol; 2-ethylisohexanol; neopentylglycol; 2-ethylbutanol; pentaerythritol; trimethylolethane; trimethylolpropane; and hydroxypivalyl hydroxypivalate.

These appropriately substituted starting materials are readily available and/or can easily be made. Amongst the chemical processes capable of making these are the "Oxo" process for the preparation of branched alcohols, and the catalyzed addition of carbon monoxide to olefins to form neo-acids.

The freezing point of these esters should be below $-40°C$, while the vapor pressure should be negligible at 100 microns and 125°C for paper capacitors and 100 microns and 100°C for plastic film capacitors. The viscosity must not exceed 1,000 centipoises at the impregnation temperature (125°C for papers capacitors and 100°C or less for film capacitors). The power factor of these materials should be less than 0.1 percent for paper and less than 0.05 percent for film capacitors. And, a flash point in excess of 350°F is needed.

Various compounds derived from the broad examples of available esters previously listed, and some of their respective properties are as follows:

(I) $$R_1-CH_2-\underset{\underset{R_3}{|}}{\overset{\overset{R_2}{|}}{C}}-\overset{O}{\overset{\|}{C}}-O-CH_2-\underset{\underset{R_5}{|}}{\overset{\overset{R_4}{|}}{C}}-CH_2-R_1$$

(a) $CH_3-CH_2-CH_2-\underset{\underset{CH_3}{|}}{\overset{\overset{CH_3}{|}}{C}}-\overset{O}{\overset{\|}{C}}-O-CH_2-\underset{\underset{H}{|}}{\overset{\overset{C_2H_5}{|}}{C}}-CH_2CH_2CH_2CH_3$ — B.P. 112°–114°C./1–2 mm.; F.P. $<-65°$ C.

(b) $CH_3-CH_2-CH_2-CH_2-CH_2-\underset{\underset{CH_3}{|}}{\overset{\overset{CH_3}{|}}{C}}-\overset{O}{\overset{\|}{C}}-O-CH_2-\underset{\underset{H}{|}}{\overset{\overset{C_2H_5}{|}}{C}}-CH_2CH_2CH_2CH_3$ — B.P. 114°–116°C./1–2 mm. F.P. $<-65°$C.

(c) $C_8H_{17}-CH_2-\underset{\underset{CH_3}{|}}{\overset{\overset{CH_3}{|}}{C}}-\overset{O}{\overset{\|}{C}}-O-CH_2-\underset{\underset{H}{|}}{\overset{\overset{C_2H_5}{|}}{C}}-CH_2CH_2CH_2CH_3$ — B.p. 154°–160° C./1–2 mm., F.P. $<-65°$C.

(d) $C_{11}H_{23}-CH_2-\underset{\underset{CH_3}{|}}{\overset{\overset{CH_3}{|}}{C}}-\overset{O}{\overset{\|}{C}}-O-CH_2-\underset{\underset{H}{|}}{\overset{\overset{C_2H_5}{|}}{C}}-CH_2CH_2CH_2CH_3$ — B.P. 156°–166° C./1–2 mm.; F.P. $<-65°$ C.

(e) $CH_3-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-CH_3$ — B.P. 208°–210° C.; F.P. $-123°$ C.

(f) $CH_3-CH_2-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-CH_2-CH_3$ — B.P. 112°–114° C./10 mm.; F.P. $-110°$ C.

(g) $CH_3-CH_2-CH_2-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-CH_2CH_2CH_3$ — B.P. 142° C./15 mm.; F.P. $-97°$ C.

(h) $C_4H_9-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-CH_2-CH_2-CH_2-CH_3$ — B.P. 169°–171° C./21 mm.; F.P. $-90°$ C.

(i) $C_5H_{11}-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-C_5H_{11}$ — B.P. 192°–194° C/19 mm.; F.P. $-86°$ C.

(j) $C_6H_{13}-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-C_6H_{13}$ — B.P. 198°–200° C./19 mm.; F.P. $-84°$ C.

(k) $CH_3-CH_2-CH_2-CH_2-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-\underset{\underset{H}{|}}{\overset{\overset{CH_3}{|}}{C}}-CH_3$ — B.P. 155°–156° C/7 mm.; Pour point $-85°$ C.; Viscosity—1.54 centistokes ($c_s$) at 212° F.

(l) $C_7O_{15}-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_3$ — B.P. 129°C./3 mm.; Pour point $-75°$ C.; Viscosity—1.81 $c_s$ at 212° F.

(m) $C_7H_{15}-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-\underset{\underset{CH_3}{|}}{\overset{\overset{CH_3}{|}}{C}}H$ — B.P. 141°–143° C/1.9 mm.; Pour point $-70°$ C. Viscosity—2.22 $c_s$ at 212° F.

(n) 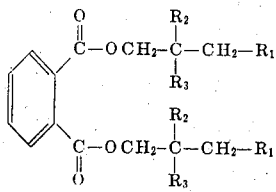  B.P. 176° C./3.3 mm.; Pour point −65° F.; Viscosity—3.05 c. at 212° F.
(o) 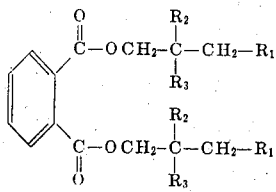  B.P. 166°–167° C./0.6 mm.; Pour point −40° F.; Viscosity— 4.56 c. at 212° F.
(II) 
(a) 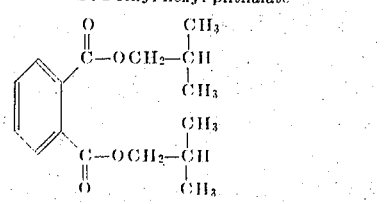  
Di-2 ethyl hexyl phthalate  
P.B. 241° C./5 mm.; Pour point −46° C.
(b) 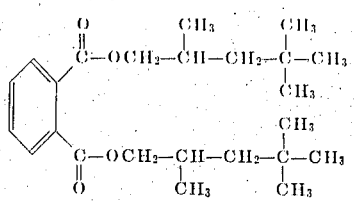  
Di-isobutyl phthalate  
B.P. 305°–315° C.
(c) 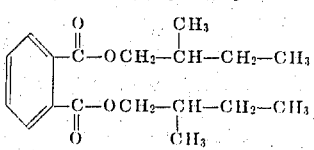  
Bis-(2,4,4-trimethyl pentyl) phthalate  
B.P. 156°–162° C./0.4 mm.
(d) 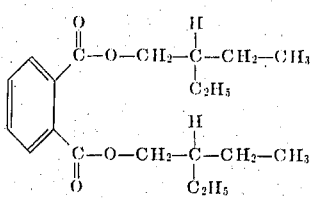  
Di-amyl phthalate  
B.P. 225° C./40 mm.
(e) 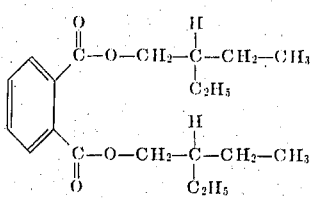  
Bis(β-ethyl butyl) phthalate  
B.P. 224° C./4 mm.
(III) 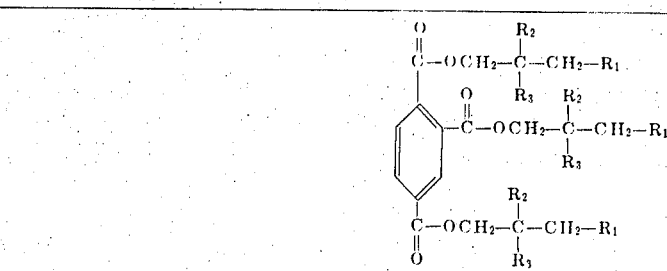

The esters listed herein can advantageously be used as dielectric impregnants. Various mixtures or blends thereof have also been found to meet the requirements for dielectric impregnants for paper and/or film capacitors. The capacitance section of a capacitor is to be fully impregnated therewith.

The polymer films contemplated by the present invention include polypropylene, polyethylene, polystyrene, etc. It is preferred to employ isotactic polypropylene of fairly high purity. This type of polypropylene is presently commercially available from several different sources. For some purposes it is advisable to employ in conjunction with the polymer film a porous cellulosic type spacer to assist in impregnation and to act as a wick for the liquid impregnant. A commonly employed material for this purpose is Kraft paper. It is also contemplated that one or both of the capacitor electrodes may be in the form of a thin metallization on the surface of the polymer film. An example of this form is aluminized polypropylene. And further, the capacitor electrodes may be in the form of a thin metallization on each surface of a porous paper such that the metallization on one surface thereof contacts the metallization on the other surface, the electrodes being separated by a plastic film dielectric. Because these esters are so stable, they should not produce any acid, and therefore are advantageously compatible with metallized electrodes, unlike the chlorinated hydrocarbon impregnant used in the prior art.

Since it is obvious that many changes and modifications can be made in the above-described details without departing from the nature and spirit of the invention, it is to be understood that the invention is not limited to said details except as set forth in the appended claims.

What is claimed is:

1. An electrical capacitor comprising a capacitor housing, a capacitance section within said housing, said section having at least a pair of electrodes and a dielectric spacer between said electrodes, said section being impregnated with a liquid dielectric comprising at least one ester having alkyl groups substituted at a position on said at least one ester selected from the group consisting of $\alpha$ to the ester carbonyl and $\beta$ to the ester ether linkage, said alkyl groups being a member selected from H, $CH_3$ and $C_2H_5$.

2. The capacitor of claim 1 wherein said liquid dielectric is at least one alkyl substituted ester of the formula

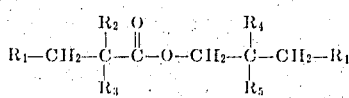

wherein $R_1$ is a $C_1$—$C_{12}$ alkyl group; $R_2$ is a member selected from $CH_3$ and H; $R_3$ is a member selected from $CH_3$ and H; $R_4$ is a member selected from $CH_3$, $C_2H_5$ and H; $R_5$ is a member selected from $CH_3$, $C_2H_5$ and H; and at least one of the groups from $R_2$ to $R_5$ is not H.

3. The capacitor of claim 1 wherein said liquid dielectric is at least one alkyl substituted ester of the formula

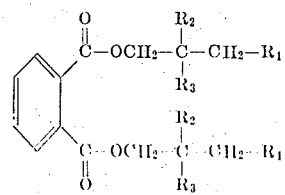

wherein $R_1$ is a $C_1$—$C_{12}$ alkyl group; $R_2$ is a member selected from $CH_3$ and $C_2H_5$; and $R_3$ is a member selected from $CH_3$ and H.

4. The capacitor of claim 1 wherein said liquid dielectric is at least one alkyl substituted ester of the formula

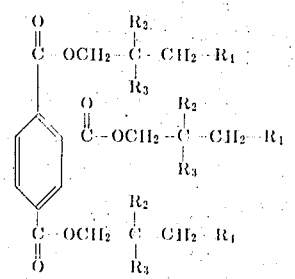

wherein $R_1$ is a $C_1$—$C_{12}$ alkyl group; $R_2$ is a member selected from $CH_3$ and $C_2H_5$; and $R_3$ is a member selected from $CH_3$ and H.

5. The capacitor of claim 1 wherein said liquid dielectric is at least one alkyl substituted ester of the formula

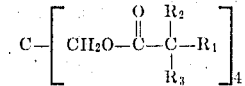

wherein $R_1$ is a $C_1$—$C_{12}$ alkyl group; $R_2$ is a member selected from $CH_3$ or H; and $R_3$ is a member selected from $CH_3$ and $C_2H_5$.

6. The capacitor of claim 1 wherein said liquid dielectric is at least one alkyl substituted ester of the formula

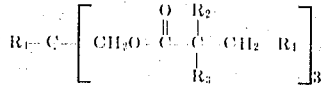

wherein $R_1$ is a $C_1$—$C_{12}$ alkyl group; $R_2$ is a member selected from $CH_3$ and H; $R_3$ is a member selected from $CH_3$ and $C_2H_5$; and $R_4$ is a member selected from the group consisting of $CH_3$ and $C_2H_5$.

7. The capacitor of claim 1 wherein said liquid dielectric is at least one alkyl substituted ester of the formula (a) 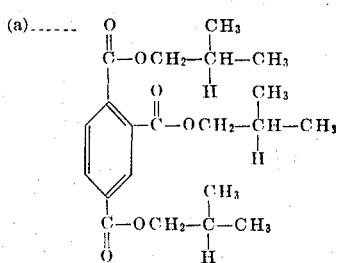  B.P. 198°–200° C./3 mm.
(b) 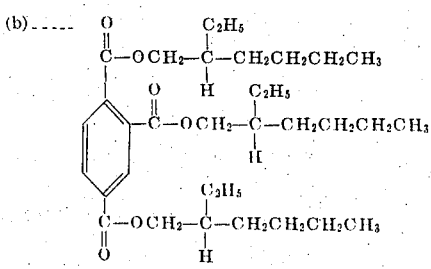  B.P. 260° C./1 mm.; M.P. −46° C.
(IV) 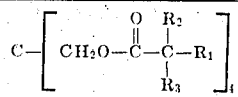
(a) 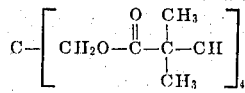  M.P. 124° C.
(b) 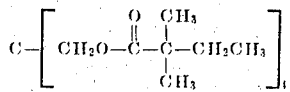  M.P. 149°–155° C.
(c) 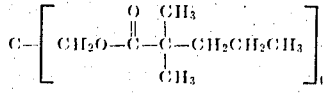  M.P. 87°–89° C.
(d) 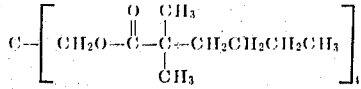  M.P. 65°–67° C.
(V) 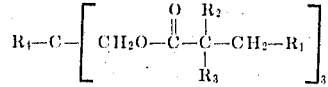
wherein $R_1$ is a $C_1$–$C_{12}$ alkyl group; $R_2$ is $CH_3$ or H; $R_3$ is $CH_3$ or $C_2H_5$; and $R_4$ is $CH_3$ or $C_2H_5$.
(a) 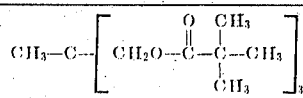  M.P. 37.5°–38.5° C.
(b) 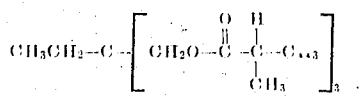  B.P. 170° C./3.5–4 mm.
(c) 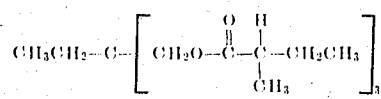  B.P. 170°–175° C./2 mm.; F.P. −67° C.
(d) 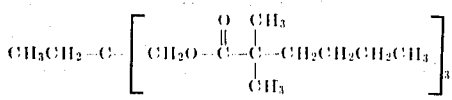  Viscosity 4.21 Cs. at 210° F.; Pour point −60° F.; Flash point 325° F.

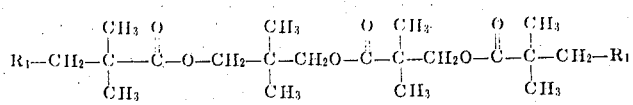

wherein $R_1$ is a $C_1$–$C_{12}$ alkyl group.

8. The capacitor of claim 1 wherein said electrodes are in the form of a thin metallization on each surface of a porous paper.

9. The capacitor of claim 1 wherein said dielectric spacer is a polyolefin film and wherein at least one of said electrodes is in the form of a metallized layer deposited on a surface of said polyolefin film.

10. The capacitor of claim 9 wherein said metallized layer is aluminum.